United States Patent [19]

Sølbeck

[11] 3,909,340

[45] Sept. 30, 1975

[54] APPARATUS FOR MANUFACTURING A SHEET MATERIAL COMPRISING A CONTINUOUS WEB OF A THERMOPLASTICS MATERIAL WITH LOCALLY SECURED FASTENER ELEMENTS

[76] Inventor: Erik Sølbeck, 342 Vedbaek Strandvej, 2950 Vedbaek, Denmark

[22] Filed: Apr. 12, 1973

[21] Appl. No.: 350,663

[30] Foreign Application Priority Data
Apr. 19, 1972 Denmark............................ 1915/72

[52] U.S. Cl. ................. 156/500; 24/141; 156/552; 156/553; 156/566; 156/573; 156/92; 156/244
[51] Int. Cl. .......................................... B29c 27/12
[58] Field of Search ....... 156/91, 92, 244, 500, 552, 156/553, 564, 566, 573; 425/96, 113, 114, 130, 131, 224, 375; 24/141, 142; 292/314; 227/51, 55, 56, 57

[56] References Cited
UNITED STATES PATENTS
3,219,507  11/1965  Penman.............................. 156/244

Primary Examiner—Charles E. Van Horn
Assistant Examiner—Caleb Weston
Attorney, Agent, or Firm—Browne, Beveridge, DeGrandi & Kline

[57] ABSTRACT

A method and an apparatus for securing fastener elements to a continuous sheet of plastics material in direct conjunction with the extrusion of the sheet and before it has solidified. Fastener elements are stacked in a magazine shaft below which there is mounted a stationary discharge passage extending towards the extruder and curved towards a moving roller or like element mounted below the extruder for receiving and advancing the extruded sheet. A flexible slide having tongues engaging with the fastener elements is reciprocated in a predetermined timing pattern within the discharge passage to take fasteners in sequence from the bottom of the magazine and deliver them unto the roller, which brings them into contact with the plastic film. Stationary tongues are provided in the discharge passage for preventing fastener elements from moving backwards when the slide is retracted.

12 Claims, 6 Drawing Figures

U.S. Patent Sept. 30,1975 Sheet 2 of 4 3,909,340
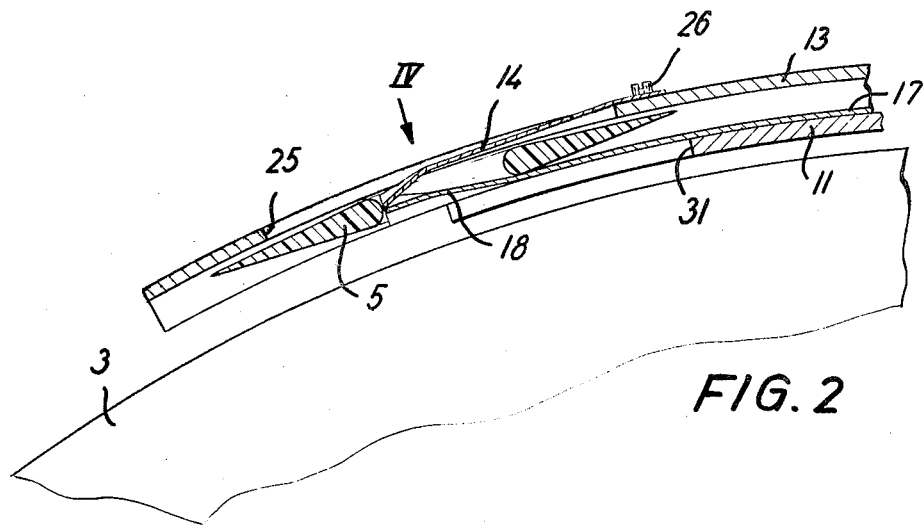
FIG. 2
FIG. 3
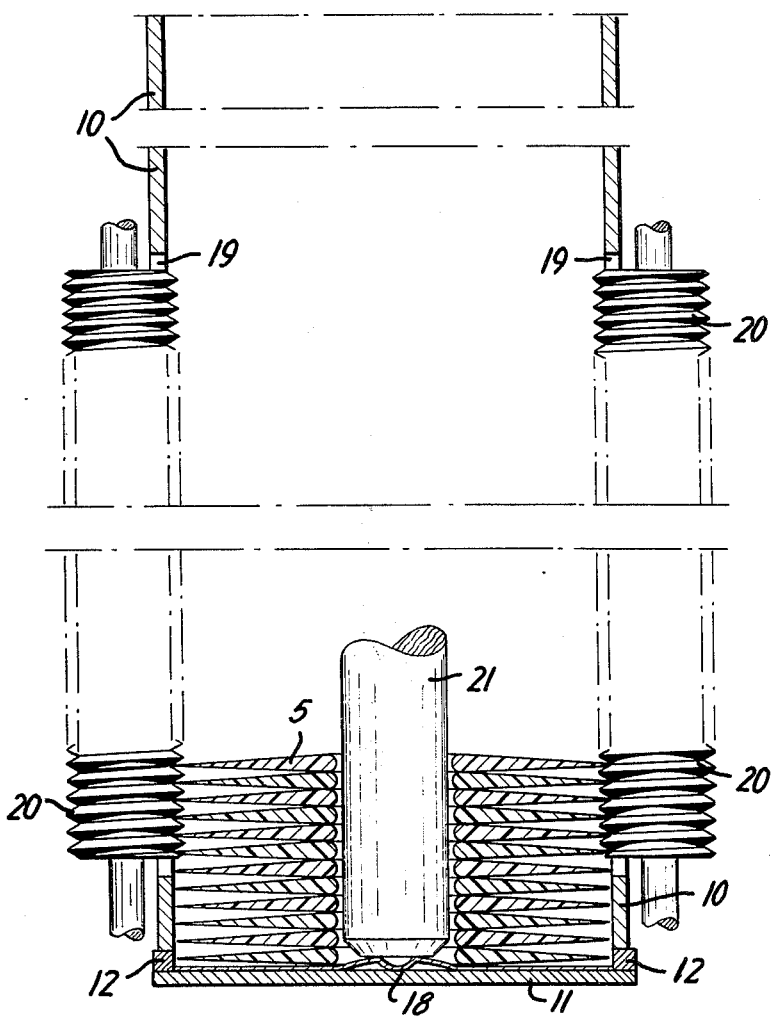

it possible to impart a desired curvature to the path of
movement of the fastener elements between the maga-
zine shaft and the nip between the rollers so as to allow
the elements to be conducted to the film in a direction
suited to effect the required bonding, while at the same
time ensuring that the elements, prior to being thus
bonded, will be held safely in place in the discharge
passage.

APPARATUS FOR MANUFACTURING A SHEET MATERIAL COMPRISING A CONTINUOUS WEB OF A THERMOPLASTICS MATERIAL WITH LOCALLY SECURED FASTENER ELEMENTS

BACKGROUND OF THE INVENTION

The present invention relates to a method of manu-
facturing a sheet material comprising a continuous web
of a thermoplastics material with locally secured fas-
tener elements, which method comprises extruding the
thermoplastics material through an elongated nozzle
orifice and cooling the extruded film in the nip between
two counterrotating rollers or equivalent means. The
sheet material may be employed for making tarpaulins,
tent-cloth and other applications in which the fastener
elements are used for securing ropes etc. intended to
take up mechanical loads upon the sheet.

The fastener elements may, for example, be eyelets,
buckles, hoops, hooks or straps which are secured
along the edges of the web and at such locations in the
interior of the web which after severing of the web into
discrete sections or sheets will be located at an edge of
a section. The fastener elements may be fabricated of
plastics, if desired with an internal reinforcement of
glass fibre or metal wires, or they may consist of metal
or other materials completely or partially coated with
a plastics material that is suitable for being secured to
the web material by way of a bond having the desired
strength in view of the forces which are to be transmit-
ted between the sheet and the ropes etc. connected to
the fastener elements, which forces may assume rather
high values.

It has so far been customary to secure fastener ele-
ments of the kind referred to by welding them onto the
web which may result in difficulties in respect of
achieving a sufficiently strong bond if the melting in-
vervals of the two plastics materials are relatively far
apart. In practice, the choice of materials for the two
components is thus rather limited. Moreover, the heat-
ing of the web or sheet to welding temperature results
in a certain reduction in its strength and local stresses
which cause the sheet to contract and/or crease, often
occur when the sheet is subsequently cooled. Addition-
ally there may occur undesirable local variations in the
thickness of the areas of the material in which welding
jaws have operated. Said disadvantages are in many
cases additionally aggravated if the sheet is reinforced
with, for instance, a wire or tape netting fabricated of
a material having a different melting temperature,
something which is often desirable in the case of tar-
paulins or other articles which have to possess great
mechanical strength.

SUMMARY OF THE INVENTION

According to the invention there is provided a
method of manufacturing a sheet material for use as
tarpaulins, tentcloth and the like and comprising a con-
tinuous web of a thermoplastics material with locally
secured fastener elements, which method comprises
extruding said thermoplastics in the form of a film
through an elongated nozzle orifice, cooling the ex-
truded film in the nip between a pair of counterrotating
rollers or equivalent means, and supplying prefabri-
cated fastener elements to the surface of one of said
rollers in timed relationship with the peripheral speed
of said roller or the like, whereby the rotation of said
rollers causes said elements to be brought in contact
with the extruded film between said nozzle orifice and
said nip and to be pulled into and through the nip to-
gether with the film.

It thus constitutes a significant novel feature of the
method according to the invention that the bonding be-
tween the fastener elements and the sheet or web mate-
rial is effected at a moment when this is still in a plastic,
partially melted state prior to being cooled, and it has
been found that a particularly intimate and strong bond
between the components of the solidified product is
achieved hereby while, at the same time, a weakening
of the sheet and the other, above-enumerated disad-
vantages of the previously employed re-heating process
are obviated. Tests have shown that the force required
for tearing an element from the sheet is substantially
greater than that necessary for tearing off an element
which has been welded on in a conventional manner.

It has been known for more than 25 years than a con-
tinuous reinforcing netting and a continuous sheet may
be bonded together by tracking the netting through the
nip between two calibrating rollers mounted below a
nozzle through which the sheet material is extruded, so
that the netting is bonded to the sheet while the mate-
rial thereof is still partially melted. Despite the knowl-
edge of this technique it has not been realized until now
that a similar method can be applied for securing ele-
ments of the kind referred to where a considerably
larger mechanical strength of the bond between the el-
ements and the sheet is required because the bond is
subjected to much larger forces than a reinforcing net-
ting, the primary purpose of which is only to act as a
barrier for preventing a local fissure or crack in the
sheet from propagating across a larger area of the
sheet.

The invention also relates to an apparatus for carry-
ing out the method, which apparatus comprises an ex-
truder head having a generally downwardly oriented
nozzle orifice, a pair of rollers mounted generally
below the nozzle orifice and laterally spaced so as to
form between them a nip for calibrating a film extruded
through the nozzle orifice, and means for continuously
rotating the rollers or corresponding nipforming mem-
bers in opposite directions. The apparatus is character-
ized by having a feeding device mounted above one of
said rollers or the like and having a substantially verti-
cally oriented magazine shaft for receiving a stack of
fastener elements, said magazine shaft being laterally
spaced from said extruder head, wall means defining a
discharge passage extending from the bottom of the
magazine shaft towards the nip, an exit opening in the
lower end of the magazine shaft connecting the shaft
with the discharge passage, a slide extending into the
discharge passage and having at least one pusher mem-
ber for withdrawing the lowermost fastener element of
a stack from the magazine shaft and pushing the ele-
ment into the passage, and drive means for effecting an
intermittent reciprocating lengthwise movement of said
slide.

With an apparatus constructed in this way it is possi-
ble to supply the fastener elements to the roller nip at
an arbitrary rate which may be periodically varying, by
controlling the driving means of the slide correspond-
ingly, preferably in timed relationship with the rotation
of the rollers and, if desired, via a programming device.

In a preferred embodiment the discharge passage of
the feeding device is curved towards the roller and the
slide is made of a thin, flexible material. This permits to obtain a very accurate spacing between the fastener elements in the finished sheet since the elements can be brought into contact with the roller very close to the roller nip and, at the same time, the arrangement provides a very wide choice with regard to the location and design of the other components of the feeding device.

The forward or leading end of the discharge passage may be laterally spaced from the extruder head. In this way it is substantially avoided that the walls of the passage and hence also the fastener elements present in the forward end of the passage are heated — by heat given off from the extruder head and the extruded film — to such an extent that the elements may soften and get jammed in the passage. It is a further advantage that the elements are not pushed directly into the plastic film which might be damaged thereby, but are rather deposited upon the surface of the roller and are brought more gently into contact with the film by means of the advancing roller surface. In this connection it must be regarded as surprising that the elements do not show any noticeable tendency to become displaced upon the roller surface during its movement towards the nip even when the surface is very smooth. Accordingly, the intended location and orientation of the fastener elements in the solidified web, as determined by the intermittent reciprocating movements of the slide, are not disturbed by the final advancing of the elements upon the roller surface.

For securing fastener elements having an aperture therethrough, there may be provided at least one pawl member on the upper wall of the discharge passage remote from the associated roller, which pawl member is adapted to engage with the aperture of a fastener element so as to prevent a rearward movement of such element in the discharge passage when the slide is retracted. This ensures that the mutual location of the elements in the passage is not disturbed during the withdrawal of the slide, not even if the passage is relatively long.

The upper wall of the discharge passage may be formed with at least one aperture which is larger than the aperture in a fastener element, and the pawl member may be a separate member secured to the said wall behind the aperture therein and extending forwardly into the aperture. There is thus formed an annular interspace or clearance between the pawl member and the edge of the aperture in the passage wall, and through this clearance a fastener element may be manually depressed and hence released if it should have got jammed in the passage.

The leading edge of the pawl member may be formed with a depression and the upper surface of the pusher member may be formed with a complementary depression in which the first mentioned depression may engage. In this way the lowermost point of the edge of the pawl member may lie below the uppermost point of the active edge of the pusher member which ensures that during the respective phases of the reciprocating movement of the slide either of the two members may engage with a major part of the height of the edge of the aperture in the fastener element.

When the fastener elements are flexible at least along their peripheral edge, there may be provided at least two threaded spindles rotatably supported along the periphery of the magazine shaft with their axes parallel to the axis of the shaft and with the threads thereon extending into the shaft, and means for continuously rotating the spindles whereby they exert a downwardly directed force upon the fastener elements of a stack within the shaft. Irrespective of the height of the stack of elements the spindles ensure the maintenance of an appropriate pressure on the lowermost element in the stack and, hence, a correct feeding thereof into the discharge passage and they permit a replenishment of the stack to be effected at any time without having to stop the apparatus.

The height of the exit opening in the magazine shaft may increase gradually from the lateral edges of the discharge passage towards the central part thereof. It is then practically impossible that two fastener elements can be withdrawn simultaneously from the magazine even in case of an abnormally high friction between them, and it is also prevented that a slightly dished or convex fastener element may become jammed in the opening.

Additionally or alternatively the simultaneous withdrawal of two fastener elements from the shaft may be prevented by providing therein an upright, freely movable rod having a cross section corresponding substantially to the cross section of an aperture in a fastener element. When the slide is moved forwardly, the pusher member thereon raises the rod clear of the aperture in the lowermost fastener element which is thus released while the next following element is still held back in the magazine.

BRIEF DESCRIPTION OF THE DRAWINGS

FIG. 2 is a vertical section on a larger scale showing that portion of the discharge passage of the feeding device which is adjacent to the extruder nozzle, FIG. 3 is a vertical section, also on a larger scale, taken along line III—III in FIG. 1.

DETAILED DESCRIPTION

Figure 1:
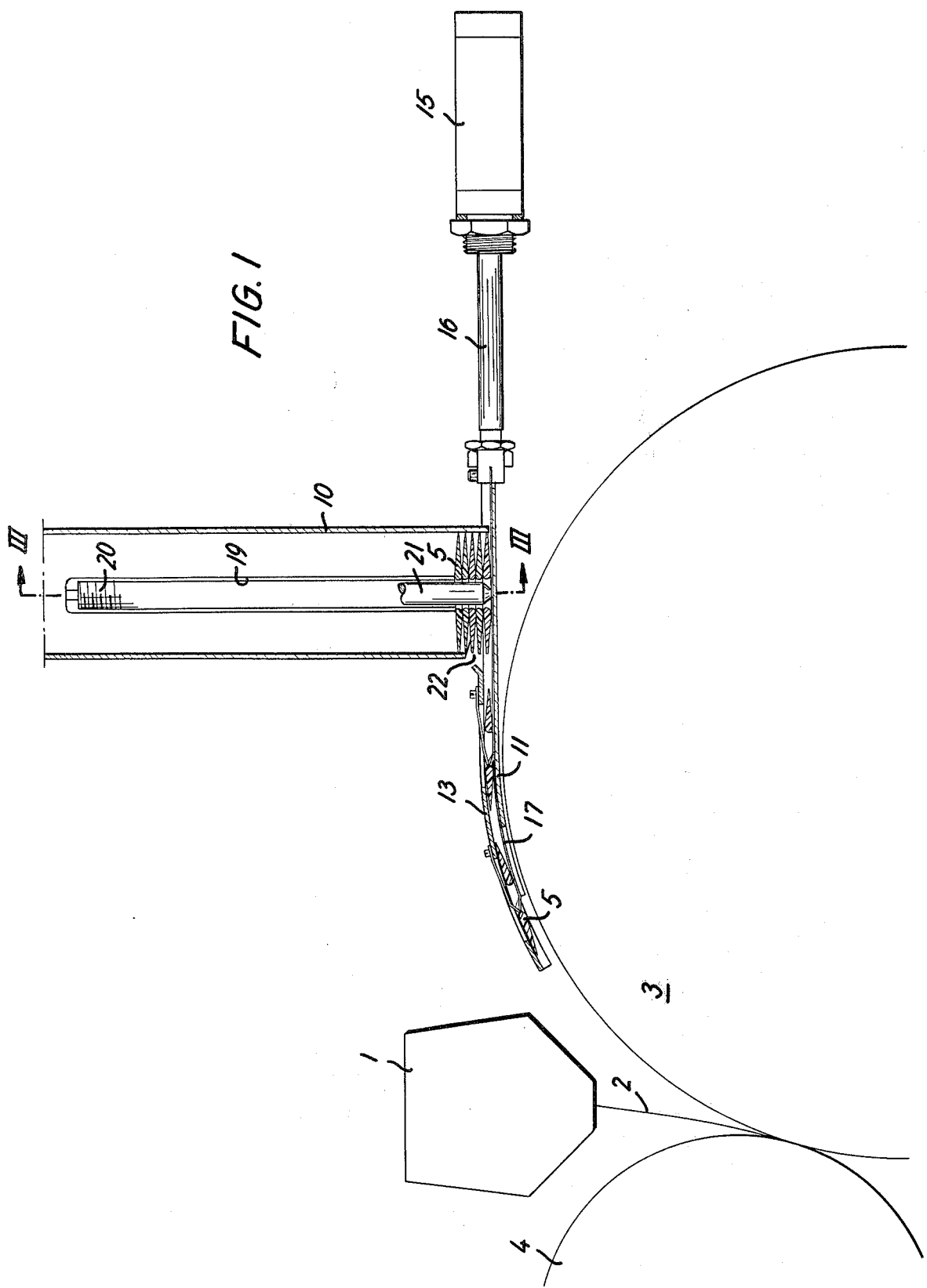
FIG. 1 is a vertical section through the parts of an apparatus embodying the invention, which are deemed essential for understanding the invention, several component parts of the apparatus having been omitted for the sake of clarity.

The apparatus illustrated in the drawings comprises an extruder head 1 connected to an extruder (not shown) and having a downwardly-facing nozzle orifice through which the plastics material processed by the extruder, e.g. polyethylene, is extruded in the form of a flowable film or sheet 2. A rotating cooling roller 3 is mounted below extruder head 1, and the film 2 is kept in contact with roller 3 by means of a counterrotating back pressure roller 4. Roller 3 may be fabricated of steel or other hard material and, during the operation of the apparatus, a suitable cooling medium is circulated through the hollow interior of the roller. Roller 4 is preferably provided with a surface of relatively soft material, such as rubber, and for the purpose of the belowdescribed securing of fastener elements to sheet 2 during its formation, the surface of roller 4 may be somewhat softer than is usually the case. The extruded sheet 2 solidifies by passing along an appropriately chosen angle of the circumference of cooling roller 3 which may be achieved in a known manner by an appropriate location of draw rollers (not shown) for advancing the sheet. As commonly known in the art, a continuous web (not shown) of reinforcement material, e.g. a netting of crossing plastics threads or tapes, may be advanced between extruder head 1 and roller 4 whereby the said web is joined together with sheet 2 in the nip between rollers 3 and 4.

Figure 5:
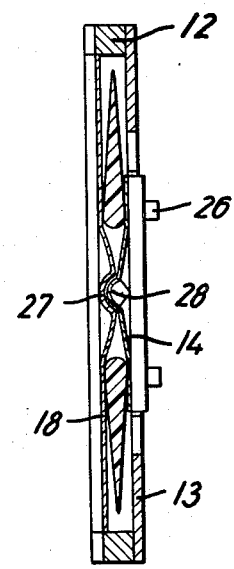
FIG. 5 is a section along line V—V in FIG. 4.
Figure 6:
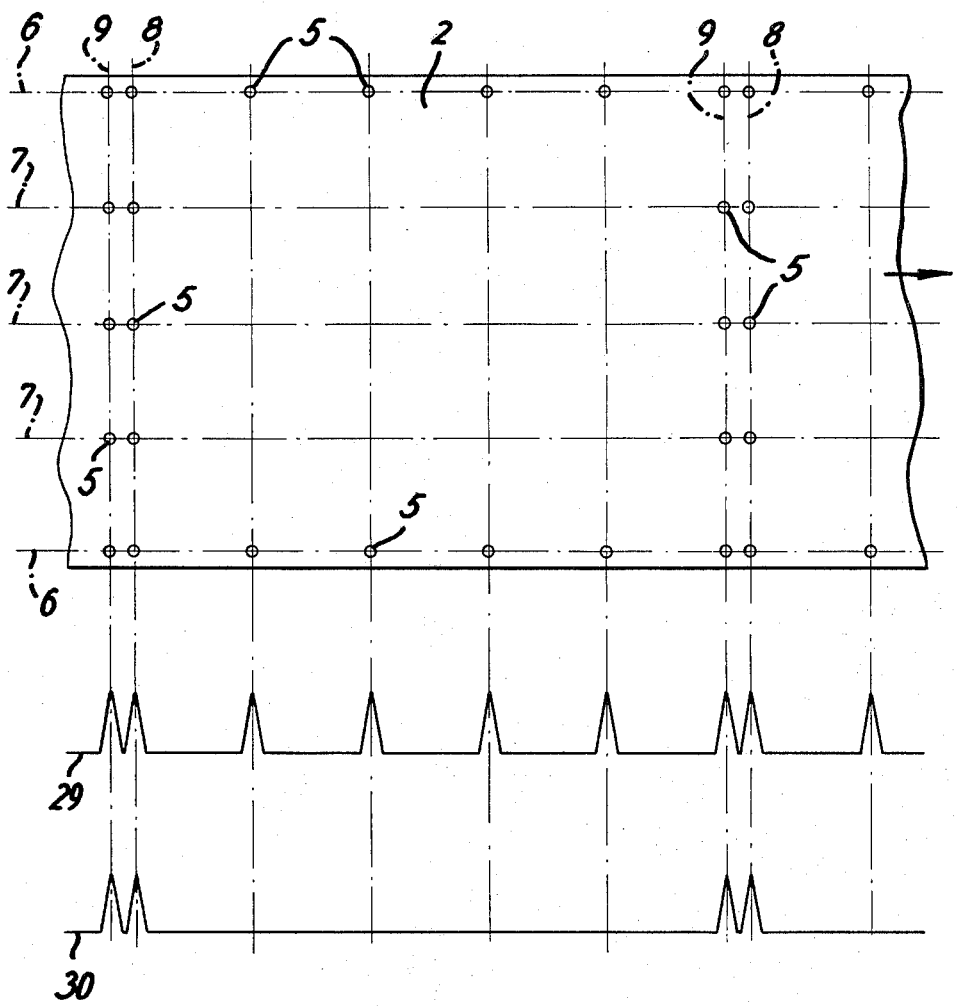
FIG. 6 is a plan view on a smaller scale illustrating a section of a sheet to which fastener eyelets have been secured in the apparatus illustrated in FIGS. 1–5, as well as a function chart of the associated feeding devices.

The apparatus herein illustrated is used for securing fastener elements which, in the embodiment shown, are formed as annular eyelets 5 shown in section in FIGS. 1–3 and FIG. 5. As indicated in FIG. 6, eyelets 5 are secured along the two lateral edges of sheet 2 in two rows which, in FIG. 6, are designated by 6, and furthermore in three rows 7 evenly distributed across the width of the sheet. In rows 7 the longitudinal spacing between some of the eyelets is greater than in rows 6. As shown in FIG. 6, six eyelets 5 are affixed equally spaced apart in each row 6, and in alignment with the first and the last eyelet, and eyelet is affixed to the sheet in each row 7, whereby two transverse rows 8 and 9 of eyelets 5 are formed. Each time a row of eyelets 8 has been affixed, the next operation comprises affixing a transverse row 9, following with the next four operations comprise securing eyelets in the two outermost rows 6 only. When the continuous sheet 2 thus provided with eyelets 5 is subsequently severed transversely between each pair of adjacent rows of eyelets 8 and 9, there is formed a plurality of discrete sheets each having fastener eyelets along all of its edges and suitable, by way of example, for use as a tarpaulin. Ropes etc. for lashing the tarpaulin may be pulled through the eyelets which are thus subjected to the forces acting upon the tarpaulin.

Eyelets 5 can be made entirely of a thermoplastics material, if desired with an internal reinforcement, and this material may be a material different from that of which sheet 2 or the above mentioned reinforcement web (if present) are made. Eyelets 5 are supplied to the nip between rollers 3 and 4 at a specific rate, which may be timed with the rotation of cooling roller 3, by means of five feeding devices constructed as shown in FIGS. 1 to 5. These devices are suitably spaced along the length of the effective roller surface corresponding to the width of sheet 2, the spacing between adjacent devices corresponding to the spacing between the longitudinally extending rows of eyelets 6 and 7, see FIG. 6.

Each of the feeding devices which are mounted on a frame (not shown) comprises a tubular, vertical magazine shaft 10 the internal cross-section of which is slightly larger than the cross-section of eyelets 5. Below the open bottom end of shaft 10, a stationary bottom plate 11 that is curved similar to the contour of roller 3, extends towards sheet 2, but ends some distance therefrom as seen in FIG. 1. As shown in FIG. 3, bottom plate 11 is slightly wider than eyelets 5 and, along its edges there are secured two lateral rails 12, to the top edges of which a cover plate 13 is affixed. Plate 13 extends parallel to plate 11 forwardly from shaft 10 and ends at a distance in front of the foremost or leading edge of bottom plate 11. Plates 11 and 13 form together with the two rails 12 a discharge passage for eyelets 5 from shaft 10. A plurality of tongues 14 are secured to cover plate 13 and they are bent downwardly towards bottom plate 11 whereby their leading edges project into the discharge passage through apertures in cover plate 13. The distance between adjacent tongues which act as barbs to prevent a rearwardly directed movement of eyelets 5 in the discharge passage is, as shown in FIG. 1, somewhat greater than the dimension of the eyelets in the longitudinal direction of the passage.

Figure 4:
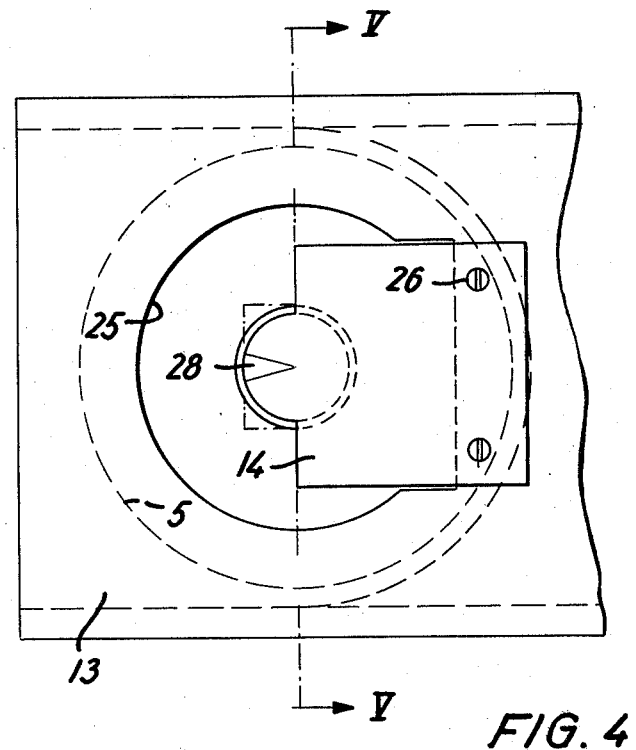
FIG. 4 is a view seen in the direction of arrow IV in FIG. 2.

By means of two screws 26 each tongue 14 is secured to the outer or upper surface of plate 13 behind an aperture 25 therein, and as best seen in FIGS. 2 and 4 the aperture 25 is larger than the aperture through an eyelet 5. As stated above, the front end of each tongue 14 is bent towards plate 11 so that the leading edge of the tongue, which is formed as an arc of a circle, can project into the aperture of an eyelet, see FIG. 2.

The advancing or feeding of eyelets 5 from magazine shaft 10 into and through passage 11–13 is effected by means of a fluid cylinder 15 shown in FIG. 1, to the piston rod 16 of which there is secured a slide 17 of thin, flexible material which is reciprocable within the discharge passage above the bottom plate 11. Tongues 18, which project upwardly in the discharge channel so as to act as pusher members for advancing the eyelets 5, are partially punched out of slide 17, and the leading edge of each tongue 18 is shaped as an arc of circle corresponding to the aperture through an eyelet 5. As best seen in FIGS. 4 and 5 the central portion of each tongue 18 is formed with a depression 27, and the central portion of each tongue 14 is formed with a complementary depression 28. Thus the active leading edge of each tongue may engage with the wall of the aperture in the eyelet through the major part of the height of said wall which ensures that the tongues will take along or hold back, respectively, an eyelet during the forward or rearward part, respectively, of the reciprocating movement o slide 17 within the discharge passage.

In the wall of magazine shaft 10 there are provided two recesses 19 located diametrically opposite one another, and a threaded vertical spindle 20 is mounted on each side of the shaft parallel to the vertical axis of the shaft, and with its thread extending inwardly through the recess 19 so as to engage with eyelets 5. By means of a driving mechanism (not shown) the two threaded spindles 20 are rotated continuously at a suitable speed and with a direction of rotation which — depending upon the hand of the thread — tends to press eyelets 5 downwardly towards the bottom plate 11. It will be appreciated that the edges of eyelets 5 are so flexible that they may yield to the pressure from the thread of the spindles, if necessary, and thus slip from one thread into the next so that spindles 20 do not have any direct influence on the rate of advance of eyelets into the discharge passage.

Centrally of shaft 10 there is disposed a cylindrical rod 21, the cross-section of which is slightly smaller than the hole in eyelets 5 and which is arranged freely movable so that under the influence of its own weight it rests against slide 17 when this assumes its forward end position as shown in FIG. 1. When the slide is withdrawn from this position by means of cylinder 15, the rearmost tongue 18 on the slide will be able to raise the rod as shown in FIG. 3 so that it no longer holds the lowermost eyelet 5 in shaft 10. While rod 21 thus permits the unimpeded advancing of the lowermost eyelet in the magazine shaft, it holds back the following eyelet, as shown in FIG. 3, and hence prevents the simultaneous advancing of two eyelets.

The eyelets are discharged from shaft 10 and into passage 11–13 via an aperture 22 in the forwardly-facing shaft wall. As shown in FIG. 1, this aperture is produced by obliquely cutting off the end surface of the shaft so that the height of the aperture is at its maximum in line with the centre of the passage and the shaft, while it diminishes towards both sides. This shape of aperture 22 contributes to prevent an eyelet which may have become slightly convex, from getting jammed in the hopper. Additionally, the rear edge of plate 13 is bent slightly upwards to correspond with the shape of aperture 22.

During operation of the apparatus, the five feeding devices are kept appropriately supplied with eyelets 5 and, by means of a timing mechanism (not shown) which — preferably through a variable gear — is coupled to the shaft of cooling roller 3, pulses are supplied to the cylinder 15 of each feeding device whereby the pistons together with the associated piston rods 16 and the slides 17 secured thereto are moved forward and, immediately thereafter, back again as indicated at the bottom of FIG. 6. Line 29 indicates the control of the cylinders 15 associated with the two outermost rows 6 of eyelets while line 30 indicates the control of the remaining feeding devices, which deliver the eyelets of the intermediate rows 7. The horizontal portions of each line indicate that the pistons, piston rods 16 and slides 17 of the respective cylinders are withdrawn while the upwardly directed pikes represent the advancing and subsequent retracting of the pistons and associated slides.

Each time a slide 17 is advanced, its rearmost tongue 18 carries the lowermost eyelet 5 along with it from the associated magazine shaft and the other tongues 18 move the eyelets previously introduced into discharge passage 11–13 one step forward. In the forward end position of a slide 17, as seen in FIG. 2, the foremost eyelet 5 in the passage rests upon the slide, and when the slide is withdrawn, the eyelet is released and drops through a semi-circular recess 31 in the leading edge of plate 11 down onto roller 3. The rotation of the roller carries the eyelet forwardly and downwardly so that under the influence of the back pressure exerted by roller 4 and the tension in the solidified sheet, the eyelet is brought into intimate contact with the still plastic film 2 and is thus bonded permanently to the sheet formed by the solidifying of the film. During the retraction of slide 17 the stationary tongues 14 of cover plate 13 ensure that the further eyelets, including the eyelet inserted in the discharge channel by the advancing slide, retain their positions in the channel.

It appears from FIG. 6 that for securing eyelets 5 according to the pattern shown, two pulses are supplied to the cylinders of all feeding devices at a relatively short interval whereby the two transverse rows 8 and 9 of eyelets are formed, and thereupon a total of four pulses are supplied at longer intervals to each of the outermost feeding devices only, corresponding to the longitudinally extending rows 6. This sequence of pulses are then repeated starting with the first mentioned two series of simultaneous pulses or signals to all the cylinders.

As an example of a practical embodiment of the invention may be mentioned the securing of fastener eyelets made of low density polyethylene having a melting point of approximately 110°C to a film of the same material which is extruded from the extruder head while, in the nip between the two rollers, a prefabricated continuous sheet of the same material and a reinforcement netting of high density polyethylene having a melting point of approximately 130°C are supplied along the surface of the back pressure roller. It will be understood that the extruded film becomes coated upon and joined to the prefabricated sheet and netting to form a unitary web structure in which also the fastener elements are securely bonded.

Among the many modifications of the described apparatus, which can be envisaged within the scope of the invention, is the use of two synchronously travelling, opposed endless conveyor belts instead of the rollers shown for withdrawing the plastic film issuing from the extruder head and cooling and solidifying the film. It is to be understood that the term "rollers" as used in the patent claims shall also be construed to cover such modified means for withdrawing the film from the extruder.

Instead of the threaded spindles illustrated which exert a downwardly directed pressure on the stack of fastener elements in the magazine it would, for instance, be possible to employ endless chains with attached brushes extending into the hopper. The flexibility of the brushes renders such a pressure exerting means suitable also for use with considerably more rigid fastener elements.

What I claim is:

1. Apparatus for manufacturing a sheet material for use as tarpaulins, tent-cloth and the like and comprising a continuous web of a thermoplastic material with locally secured fastener elements, said apparatus comprising
    an extruder head having an elongated generally downwardly oriented nozzle orifice,
    a pair of rollers mounted generally below said nozzle orifice and laterally spaced so as to form between them a nip for calibrating a film extruded through said nozzle orifice, and means for continuously rotating said rollers in opposite directions, and
    a feeding device mounted above one of said rollers and comprising a magazine for containing a supply of fastener elements, said magazine being laterally spaced from said extruder head,
    wall means defining a discharge passage extending from said magazine towards said roller nip,
    an exit opening in said magazine connecting the magazine with the passage,
    a slide extending into said discharge passage and having at least one pusher member for withdrawing one fastener element at a time from said magazine and pushing it into the discharge passage,
    and drive means for effecting an intermittent reciprocating lengthwise movement of said slide in timed relationship with the peripheral speed of said one roller.

2. Apparatus as claimed in claim 1 wherein said discharge passage is curved towards the associated roller, and said slide is made of a thin flexible material.

3. Apparatus as claimed in claim 1 in which said slide carries a plurality of pusher members spaced longitudinally of said slide.

4. Apparatus as claimed in claim 1 wherein the leading end of said discharge passage is laterally spaced from said extruder head.

5. Apparatus as claimed in claim 1 wherein said magazine comprises a substantially vertically oriented magazine shaft for receiving a stack of fastener elements, said exit opening being provided in the lower end of said shaft, whereby said reciprocating movement of said pusher member effects a transfer of the lowermost fastener element present in said shaft into said discharge passage.

6. Apparatus as claimed in claim 5 for securing fastener elements, which are flexible at least along their peripheral edge, further comprising at least two threaded spindles rotatably supported along the periphery of said magazine shaft with their axes parallel to the axis of said shaft and with the threads thereon extending into said shaft, and means for continuously rotating said spindles, whereby they exert a downwardly directed force upon the fastener elements of a stack within said shaft.

7. Apparatus as claimed in claim 5 wherein the height of said exit opening in said magazine shaft increases gradually from the lateral edges of said discharge passage towards the central part thereof.

8. Apparatus as claimed in claim 5 and for securing fastener elements having an aperture therethrough, wherein at least one pawl member is provided on the upper wall of said discharge passage remote from the associated roller, said pawl member being adapted to engage with the aperture of a fastener element so as to prevent a rearward movement of said element in said discharge passage when the slide is retracted.

9. Apparatus as claimed in claim 8, wherein a depression is formed in the leading edge of said pawl member, and the upper surface of said pusher member is formed with a complementary depression, in which the first-mentioned depression may engage.

10. Apparatus as claimed in claim 8, wherein said upper wall is formed with at least one aperture, which is larger than the aperture in a fastener element, and said pawl member is a separate member secured to said wall behind said aperture therein and extending forwardly into the aperture.

11. Apparatus as claimed in claim 8, further comprising an upright rod freely movable within said magazine shaft and having a cross-section smaller than the cross section of said aperture in a fastener element.

12. Apparatus as claimed in claim 11, wherein said rod has a convex lower end.

* * * * *